(12) United States Patent
Baldwin

(10) Patent No.: US 7,779,714 B2
(45) Date of Patent: Aug. 24, 2010

(54) SURROGATE ENGINE SPEED SIGNAL FOR CONTROLLING A DUAL CLUTCH POWERSHIFT TRANSMISSION

(75) Inventor: Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 11/934,405

(22) Filed: Nov. 2, 2007

(65) Prior Publication Data

US 2009/0118088 A1 May 7, 2009

(51) Int. Cl.
*F16H 59/00* (2006.01)
(52) U.S. Cl. .................. 74/336 R; 477/116
(58) Field of Classification Search .......... None
See application file for complete search history.

(56) References Cited

U.S. PATENT DOCUMENTS

| | | | |
|---|---|---|---|
| 4,461,188 A | 7/1984 | Fisher | |
| 5,454,763 A | 10/1995 | Ikebuchi et al. | |
| 6,595,077 B1 | 7/2003 | Geiberger et al. | |
| 6,766,705 B1 * | 7/2004 | Hall, III | 74/331 |
| 6,869,382 B2 | 3/2005 | Leising et al. | |
| 6,958,028 B2 | 10/2005 | Janson et al. | |
| 7,044,014 B2 | 5/2006 | Janson et al. | |
| 7,073,407 B2 * | 7/2006 | Stefina | 74/331 |
| 7,097,584 B2 * | 8/2006 | Kuhstrebe | 475/218 |
| 7,246,536 B2 | 7/2007 | Baldwin | |
| 2007/0051196 A1 | 3/2007 | Baldwin | |
| 2007/0175720 A1 | 8/2007 | Yoshida et al. | |
| 2008/0236317 A1 | 10/2008 | Matsushita et al. | |

FOREIGN PATENT DOCUMENTS

JP 2005172101 A1 6/2005

* cited by examiner

*Primary Examiner*—Roger L Pang
*Assistant Examiner*—Justin Holmes
(74) *Attorney, Agent, or Firm*—David B. Kelley; MacMillan, Sobanski & Todd, LLC

(57) ABSTRACT

A method for launching a vehicle having an engine shaft, first and second transmission input shafts, first and second input clutches, a coupler, a power path, and an output, the method including engaging the coupler to connect the first input shaft and the first output shaft through the power path, engaging the second input clutch to connect the engine shaft and the second input shaft mutually, using a speed of the second input shaft to determine a desired clutch torque capacity of the first input clutch, and actuating the first input clutch to produce the desired clutch torque capacity of the first input clutch and to complete a drive connection between the first input shaft and the output.

12 Claims, 3 Drawing Sheets

SURROGATE ENGINE SPEED SIGNAL FOR CONTROLLING A DUAL CLUTCH POWERSHIFT TRANSMISSION

BACKGROUND OF THE INVENTION

1. Field of the Invention

This invention relates generally to a dual clutch powershift transmission, and to launching a vehicle having such a transmission.

2. Description of the Prior Art

A powershift transmission is a geared mechanism that includes no torque converter, but instead employs two input clutches driveably connected to an engine crankshaft. A powershift transmission produces multiple gear ratios in forward and reverse drive and transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

A need exists for continuing to operate a dual clutch powershift transmission when communication between a transmission controller and an engine controller is lost, because shifting the transmission to neutral gear operation is considered a very high severity failure.

SUMMARY OF THE INVENTION

A method for launching a vehicle having an engine shaft, first and second transmission input shafts, first and second input clutches, a coupler, a power path, and an output, the method including engaging the coupler to connect the first input shaft and the first output shaft through the power path, engaging the second input clutch to connect the engine shaft and the second input shaft mutually, using a speed of the second input shaft to determine a desired clutch torque capacity of the first input clutch, and actuating the first input clutch to produce the desired clutch torque capacity of the first input clutch and to complete a drive connection between the first input shaft and the output.

In the event that communication between a transmission controller and an engine controller is lost or flawed, the control method and system engage an input clutch to connect the engine shaft and a second input shaft other than the first input shaft, which is associated with the on-coming gear to be engaged during the vehicle launch. In this way, the speed signal of the second input shaft accurately represents engine speed, is transmitted to the transmission controller, and is used to produce a desired torque capacity of the first input clutch.

The strategy requires an engine speed signal only during launch. Output speed is used to schedule gear shifts. All even gears are deselected during vehicle launch and the even-numbered gear clutch is closed. Under those conditions, the even-numbered gear input shaft speed sensor is used as the engine speed sensor.

The control strategy launches a vehicle equipped with a dual clutch transmission when communications between the engine controller and the transmission controller have been interrupted.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
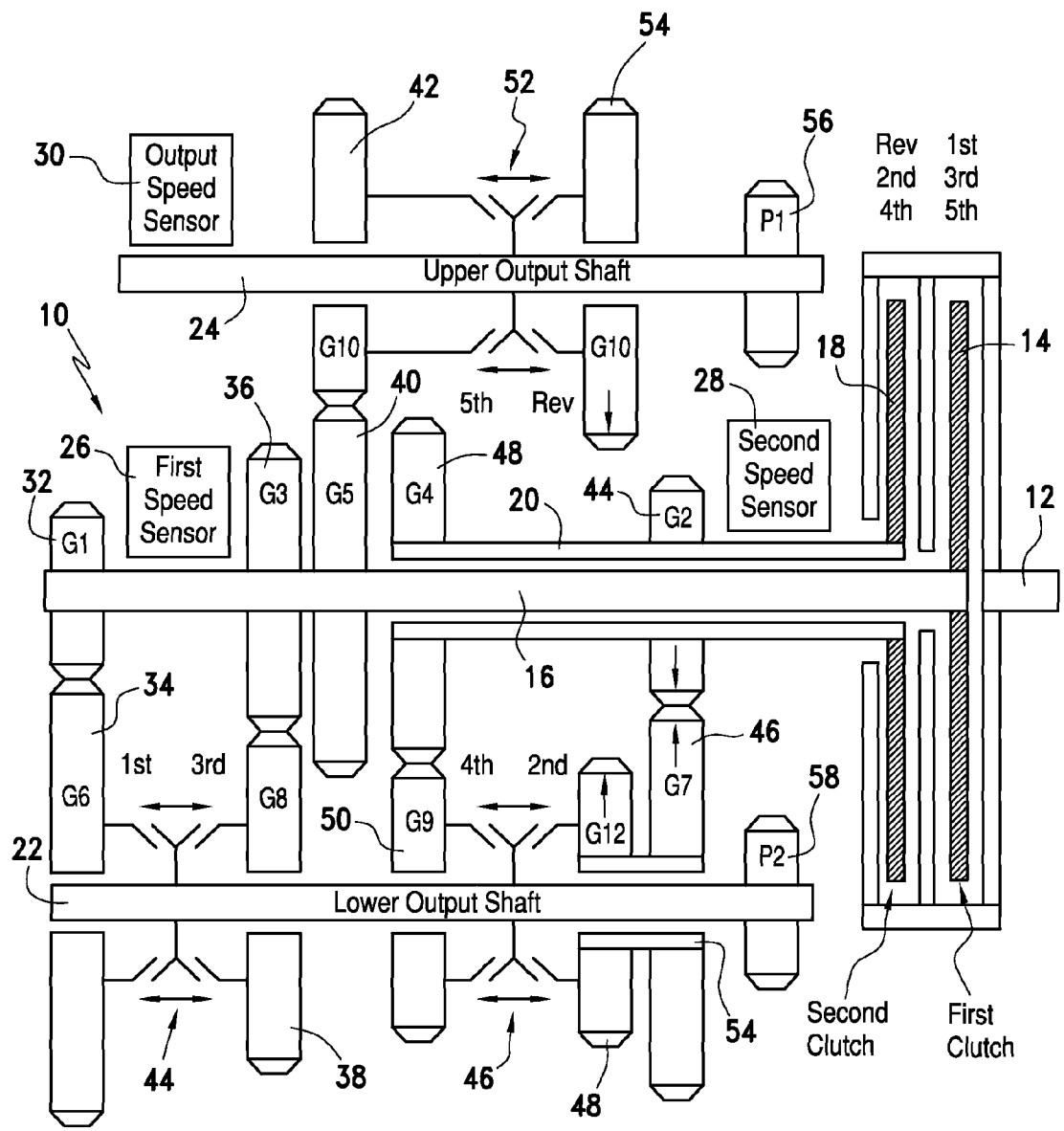
FIG. 1 is a schematic diagram showing a dual clutch powershift automatic transmission.

Referring now to FIG. 1, a dual clutch power shift transmission 10 is driveably connected to the crankshaft 12 of an engine or a shaft driven by another power source, such as an electric motor. A first input friction clutch 14 alternately connects and disconnects shaft 12 and a first input shaft 16 as clutch 14 is engaged and disengaged, respectively. A second input friction clutch 18 alternately connects and disconnects shaft 12 and a second input shaft 20 as clutch 18 is engaged and disengaged, respectively.

A first set of selectable power paths, which produce the odd-numbered gears of the transmission, connect first input shaft 16 to a load, such as the driven wheels of a motor vehicle, through a powertrain that may include a drive shaft, differential mechanism and axle shafts. The first or third gear power paths are activated by moving coupler 44 to connect gear 34 or 38, respectively, to output shaft 22. Similarly, the fifth gear power path is activated by moving coupler 52 to connect gear 42 to output shaft 24. A second set of selectable power paths, which produce the even-numbered gears of the transmission, connect second input shaft 20 to the load. The second or fourth gear power paths are activated by moving coupler 46 to connect gear 46 or 50, respectively, to output shaft 22. The reverse gear power path is activated by moving coupler 52 to connect gear 54 to output shaft 24. When couplers 46 and 52 are in the neutral position, no drive connection between input shaft 20 and the load exists.

A first speed sensor 26 produces an electronic signal representing the rotational speed of input shaft 16. The second speed sensor 28 produces an electronic signal representing the rotational speed of input shaft 20, which produce the even-numbered gears and reverse gear. A third speed sensor 30 produces an electronic signal representing the rotational speed of output shaft 24.

The first gear power path, one of the first set of power paths, includes a pinion 32, secured to input shaft 16; a first gear output 34, journalled on output shaft 22 and in continuous meshing engagement with pinion 32; and a coupler 44. A third gear power path includes pinion 36, secured to input shaft 16; a third gear output 38, journalled on output shaft 22 and in continuous meshing engagement with pinion 36; and coupler 44. A fifth gear power path includes pinion 40, secured to input shaft 16; a fifth gear output 42, journalled on output shaft 24 and in continuous meshing engagement pinion 40; and a coupler 52.

The second gear power path, one of the second set of power paths, includes a pinion 44, secured to input 20; gear 46 and idler 48, which are secured mutually and journalled on output shaft 22, gear 46 being in continuous meshing engagement with pinion 44; and coupler 46. A fourth gear power path includes pinion 48, secured to input shaft 20; a fourth gear output 50, journalled on output shaft 22 and in continuous meshing engagement pinion 48; and coupler 46. The reverse gear power paths includes pinion 44, gear 46, idler 48 and reverse output gear 54, which is journalled on output shaft 24 and in continuous meshing engagement with idler 48, and coupler 52.

Coupler 44 includes a selector sleeve, which moves leftward to engage clutch teeth on the first gear output 34, and moves rightward to engage clutch teeth on the third gear output 38. Coupler 44 produces a drive connection between gears 34 and 38, and output shaft 22, depending on the direction that the selector sleeve is moved. Similarly, coupler 46 includes a selector sleeve that moves leftward to produce a drive connection between fourth gear output 50 and output shaft 22, and moves rightward to produce a drive connection between idler 48 and output shaft 22. Idler 48 is secured to a sleeve shaft 54, on which output gear 46 is journalled on output shaft 22. Coupler 52 includes a selector sleeve that moves leftward to produce a drive connection between fifth gear output 42 output shaft 24, and moves rightward to produce a drive connection between reverse gear output 54 and output shaft 24.

Gears 56, 58 are both in continuous meshing engagement with a common output ring gear (not shown), thereby mutually connecting upper output shaft 24 and lower output shaft 22 such that the transmission includes a single output connected to a driven load.

Couplers 44, 46 and 52 are preferably synchronizers of the type used in automotive manual transmissions to connect a gear or pinion to a shaft, after synchronizing the speed of the shaft and that of the pinion or gear. Each coupler may also disconnect the shaft and the associated pinion or gear. Alternatively, each coupler may be a dog clutch having teeth that are engaged with dog teeth on a gear or pinion. This invention may use couplers in any combination of synchronizers and dog clutches. Each coupler is composed of a hub secured to the shaft and a sleeve which is supported on the hub for sliding movement leftward or rightward into engagement with dog teeth on the adjacent gear or pinion. In the case where a coupler is a synchronizer, it is provided with a conical surface, which engages mutually with a corresponding conical surface located on the gear or pinion. When the synchronizer is engaging either of its adjacent gears, these conical surfaces are forced together into frictional contact, and that frictional engagement synchronizes the speed of the gear to that of the shaft before the dog teeth engage. Other types of synchronizers or couplers may also be used.

Figure 2:
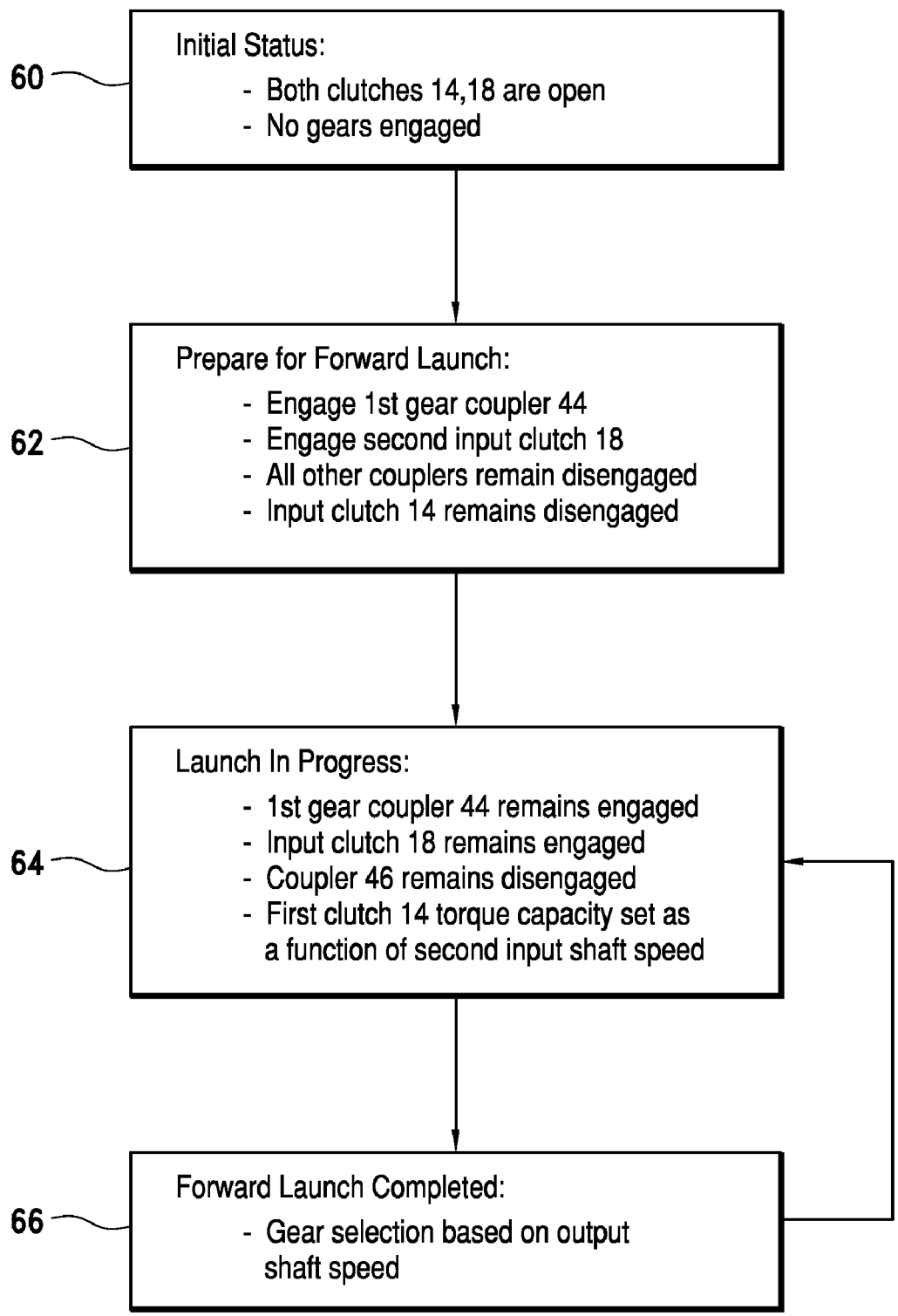
FIG. 2 is state diagram illustrating the subject control strategy.

Referring now to FIG. 2, the vehicle can be launched, i.e. accelerated from a stopped or nearly stopped condition, using the first gear power path beginning with an initial transmission state 60, in which input clutches 14, 18 and couplers 44, 46, 52 are disengaged, thereby connecting no power path to the output shafts 22, 24.

Transmission 10 is prepared to launch the vehicle when placed in a second state 62, in which the selector sleeve of coupler 44 is moved leftward to connect first gear output 34 to the output shaft 22, input clutch 18 is engaged, all couplers associated with the even numbered gears remain disengaged, and input clutch 14 remains disengaged.

In the next state 64, transmission 10 completes the engagement of first that launches the vehicle. Coupler 44 remains engaged and connecting first gear output 34 to output shaft 22, input clutch 18 remains engaged and driving input shaft 20 at the speed of engine shaft 12, couplers 46 and 52 remain disengaged, and the torque capacity of the first input clutch 14 is increased as a function of the speed of the second input shaft 20, as represented by the signal produced by speed sensor 28. The speed of first input shaft 16 is then equal to the speed of second input shaft 20.

Speed sensor 28 is a surrogate for an engine speed sensor. It is assumed that the engine throttle is either mechanically connected to the accelerator pedal or is controlled by an engine controller as a function of accelerator pedal position.

A forward launch of the vehicle is completed in transmission state 66, in which the even-numbered and odd-numbered gears are selected sequentially based on the speed of the output shaft as represented by the signal produced by speed sensor 30. The output shaft speed, which is less than a reference speed for the current gear, is fed forward to select the next gear.

When a gear is selected, its corresponding coupler connects the selected gear to its output shaft, the input clutch associated with the off-going gear is disengaged, and the input clutch associated with the oncoming gear is engaged.

Although the method has been described with reference to a vehicle launch in first gear, the launch can be executed using the reverse gear power path beginning with an initial transmission state, in which input clutches 14, 18 and couplers 44, 46, 52 are disengaged, thereby connecting no power path to the output shafts 22, 24.

Transmission 10 is prepared to launch the vehicle in reverse when the selector sleeve of coupler 52 is moved rightward to connect reverse gear output 54 to the output shaft 24, input clutch 14 is engaged, all couplers associated with the odd-numbered gears remain disengaged, and input clutch 18 remains disengaged.

The transmission 10 completes the engagement that launches the vehicle in reverse when coupler 52 remains engaged and connecting reverse gear output 54 to output shaft 22, input clutch 14 remains engaged and driving input shaft 16 at the speed of engine shaft 12, couplers 44 and 46 remain disengaged, and the torque capacity of the second input clutch 18 is increased as a function of the speed of the first input shaft 16, as represented by the signal produced by speed sensor 26.

Figure 3:
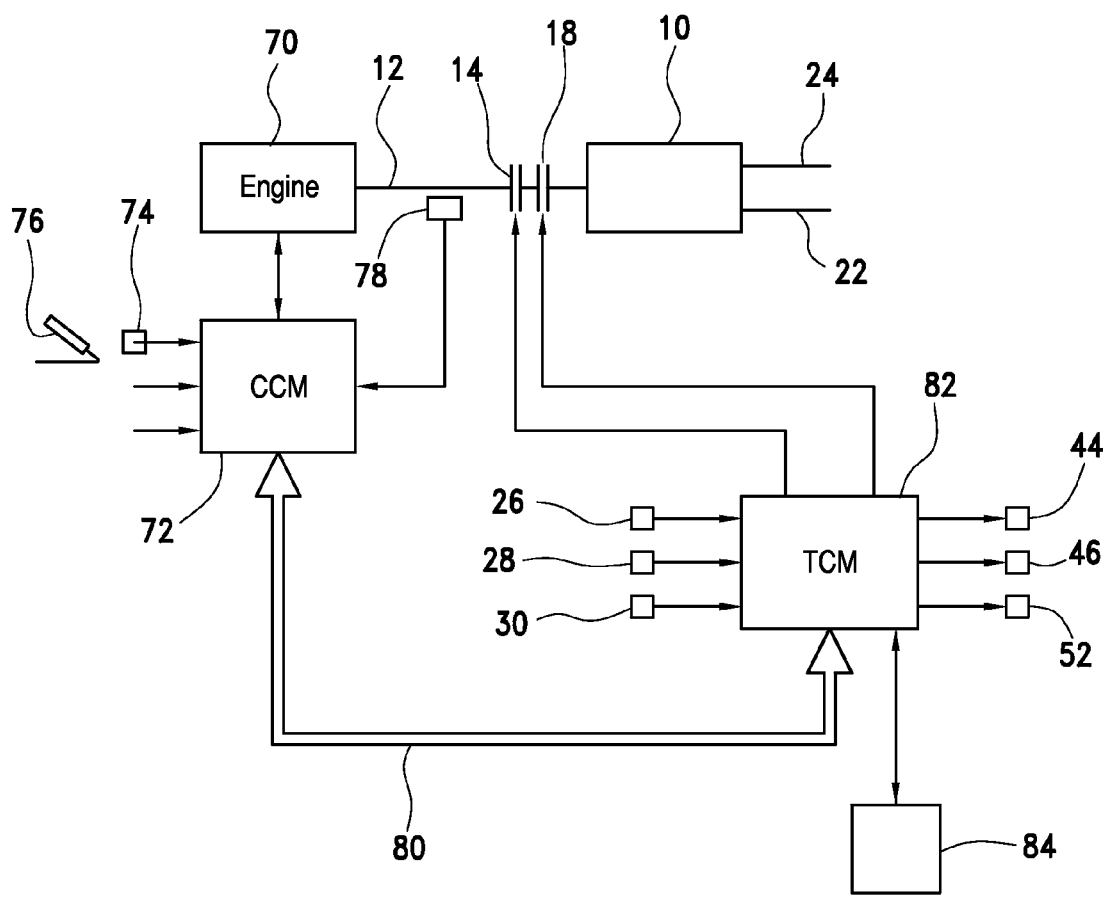
FIG. 3 is a schematic diagram of a system for controlling a vehicle launch using a dual clutch transmission, such as that shown in FIG. 1.

FIG. 3 illustrates schematically an engine 70 controlled by an electronic engine control module 72 (ECM), which issues commands that control operation of the engine. Engine controller 72 receives input from various sensors including a sensor 74, which produces an electronic signal representing the degree to which an accelerator pedal 76 is depressed, and a sensor 78, which produces a signal representing the speed of engine crankshaft 12.

The engine controller 72 communicates by a data bus 80 with an electronic transmission control module 82 (TCM), which issues commands that control operation of the input clutches 14, 18 and couplers 44, 46, 52 in response to the results produced by executing transmission control algorithms. Data used in the execution of the algorithms is received as input from various electronic signals including speed sensors 26, 28, 30 and engine speed transmitted on bus 80 from ECM 72. Stored in electronic memory accessible to the CPU of TCM 82 is a function 84 in the form of a lookup table indexed by engine speed and the oncoming gear in which the vehicle will be launched, the function containing a desired torque capacity of the input clutch that corresponds to the oncoming gear.

A conventional control strategy would set the torque capacity of the launch clutch as a function of engine speed. But, in the event communication of the current engine speed to TCM 82 is faulty or absent, the control strategy for launching the vehicle using the surrogate input signals from sensor 28 for a launch in first gear, or sensor 26 for a launch in reverse, is used.

In accordance with the provisions of the patent statutes, the preferred embodiment has been described. However, it should be noted that the alternate embodiments can be practiced otherwise than as specifically illustrated and described.

What is claimed is:

1. A method for launching a vehicle having an engine shaft, first and second input clutches, first and second transmission input shafts, a coupler, a transmission, a power path and an output, comprising the steps of:
   (a) engaging the coupler to connect the first input shaft and the output shaft through the power path;
   (b) engaging the second input clutch to connect the engine shaft and the second input shaft mutually;
   (c) using a speed of the second input shaft to determine a desired clutch torque capacity of the first input clutch; and
   (d) actuating the first input clutch to produce the desired clutch torque capacity of the first input clutch and to complete a drive connection between the first input shaft and the output.

2. The method of claim 1 further comprising the step of disengaging the input clutches before engaging the coupler.

3. The method of claim 1 wherein the transmission includes a second power path, and the method further comprising the step of using a speed of the output to select the second power path.

4. The method of claim 1 wherein step (a) further comprising the step of engaging the coupler to connect the first input shaft and the first output shaft through a forward gear of the transmission.

5. The method of claim 1 wherein step (a) further comprising the step of engaging the coupler to connect the first input shaft and the first output shaft through a reverse gear of the transmission.

6. A method for launching a vehicle having an engine shaft, first and second input clutches, first and second transmission input shafts, an output, a first power path for connecting the first input shaft and the output through an odd-numbered gear, a transmission, and a coupler, comprising the steps of:
   (a) engaging the coupler to connect the first input shaft and the first output shaft through the first power path;
   (b) engaging the second input clutch to connect the engine shaft and the second input shaft mutually;
   (c) using a speed of the second input shaft to determine a desired clutch torque capacity of the first input clutch; and
   (d) actuating the first input clutch to produce the desired clutch torque capacity of the first input clutch and to complete a drive connection between the first input shaft and the output through said first power path.

7. The method of claim 6 further comprising the step of disengaging the input clutches before engaging the coupler.

8. The method of claim 6 wherein the vehicle has a second power path that connects the second input shaft and the output through an even-numbered gear, and the method further comprising the step of using a speed of the output to select the second power path.

9. The method of claim 6 wherein step (a) further comprising the step of engaging the coupler to connect the first input shaft and the output through a forward gear of the transmission.

10. A system for launching a vehicle comprising:
    an engine shaft;
    a transmission including first and second input shafts, first and second input clutches alternately connecting and disconnecting the engine shaft and the first and second input shafts, respectively, an output, a power path including a coupler for driveably connecting the first input shaft and the output through an odd-numbered gear;
    a speed sensor for producing a signal representing a speed of the second input shaft; and
    a controller communicating with the speed sensor and configured to engage the coupler and connect the first input shaft and the output mutually through the power path; to engage the second input clutch and connect the engine shaft and the second input shaft mutually; to use a speed of the second input shaft to determine a desired clutch torque capacity of the first input clutch; and to actuate the first input clutch and produce the desired clutch torque capacity of the first input clutch.

11. The system of claim 10 wherein the controller is further configured to disengage the input clutches before engaging the coupler.

12. The system of claim 10 wherein:
    the transmission further includes a second power path including a coupler for driveably connecting the second input shaft and the output through an even-numbered gear;
    the vehicle further includes a second speed sensor for producing a signal representing a speed of the output; and
    the controller communicates with the second speed sensor and is further configured to use the speed of the output to select the second power path.

* * * * *